March 31, 1953 — F. A. KROHM — 2,632,908
ADAPTER FOR CONNECTING WINDSHIELD
WIPER BLADES TO ACTUATING ARMS
Filed June 9, 1950

INVENTOR.
FRED A. KROHM
BY Charles S. Penfold
ATTORNEY

Patented Mar. 31, 1953

2,632,908

UNITED STATES PATENT OFFICE 2,632,908

ADAPTER FOR CONNECTING WINDSHIELD WIPER BLADES TO ACTUATING ARMS

Fred A. Krohm, Gary, Ind., assignor to Productive Inventions, Inc., a corporation of Indiana Application June 9, 1950, Serial No. 166,997

5 Claims. (Cl. 15—250)

This invention relates to windshield wiper and particularly to means for connecting a wiper blade to an arm.

Windshield wiper actuating arms have a longer life than the wiper blades with the result that wiper blades of current manufacture must be adapted to operate with various types of actuating arms which have been used to equip automotive vehicles.

More specifically, an object of the invention is to provide a novel adapter or connecting means between a curved hook on the free end of an arm and a wiper blade not originally constructed to cooperate with such an arm.

A particular object of the invention is to provide an improved adapter which is preferably constructed for assembly with the hook on the arm prior to connection with a fitting normally associated with a wiper blade.

A significant object of the invention is to provide an assembly in which the fitting is provided with a bearing portion and the adapter with a pair of abutments spaced with respect to one another and with respect to the bearing portion so that the hook of the arm will assume a position between the abutments and between one abutment and the bearing portion to maintain a lug or projection provided on the hook in relation to said one abutment to prevent release of the adapter from the hook.

An important object of the invention is to provide an adapter with end walls for engagement with the fitting on the blade to substantially prevent tilting of the adapter with respect to the fitting and at the same time prevent the hook on the arm from being inserted into either end of the adapter.

An additional object is to provide the adapter with a part adapted to cooperate with the fitting and a latch means associated therewith in such a manner that it is impossible to disconnect the adapter from the fitting and arm without first manually actuating the latch to release such part.

Another object of the invention is to provide a construction whereby the operation of the fitting and latch means associated with the blade is influenced by the inherent resilience of the wiper element constituting a component of the blade.

A further object of the invention is to provide an adapter of the character indicated which is inexpensive to manufacture, of durable construction and efficient in service.

Other objects and advantages of the invention will appear after the description hereinafter set forth is considered in conjunction with the drawing annexed hereto.

One embodiment of the invention is shown for illustrative purposes in the accompanying drawing, in which.

Figure 1:
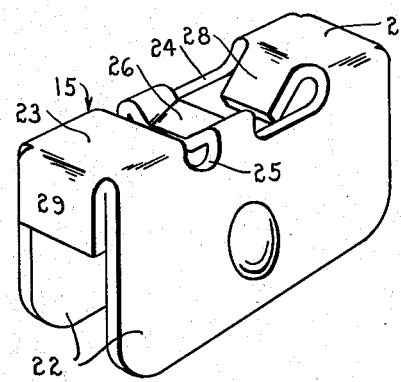
Figure 1 is an enlarged perspective view of the adapter.
Figure 2:
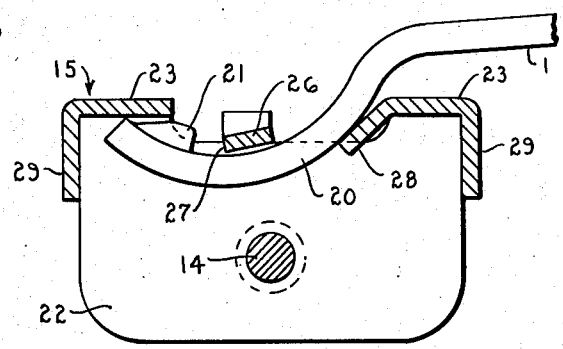
Figure 2 is an enlarged side view of the adapter connected with a wiper arm.
Figure 3:
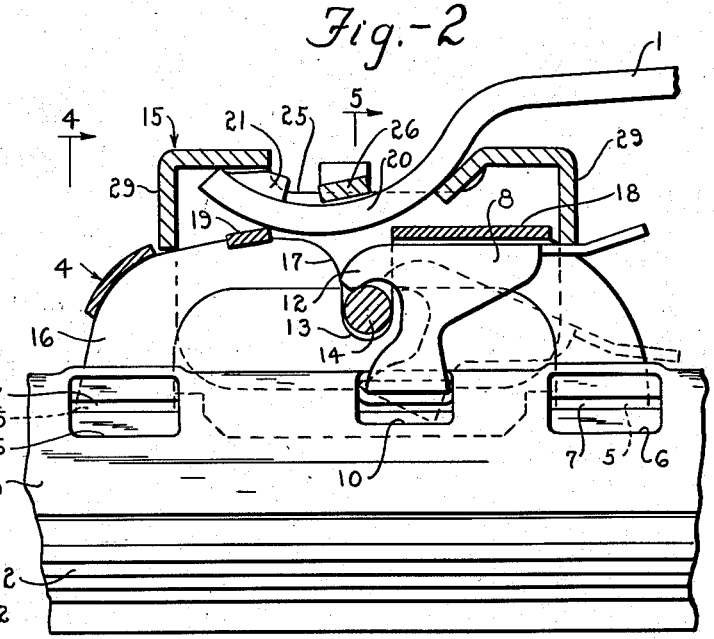
Figure 3 is an enlarged side view showing the adapter assembled with the arm and a fitting on a wiper blade, portions of which are in section to clearly illustrate the relationship of the parts.

Referring particularly to Figures 2 and 3 of the drawing, the adapter is shown operatively connecting a windshield wiper blade to a wiper actuating arm 1. The wiper blade comprises a resilient wiping element 2, a channel support 3 therefor, and an attaching means or connector 4 rockably or pivotally supported on the resilient wiping element 2 by means of two pairs of inturned integral lugs or projections 5 extending through clearance apertures 6 in each side of the support 3 and engaging slots or grooves 7 preferably formed throughout the length of resilient wiping element 2.

Figure 5:
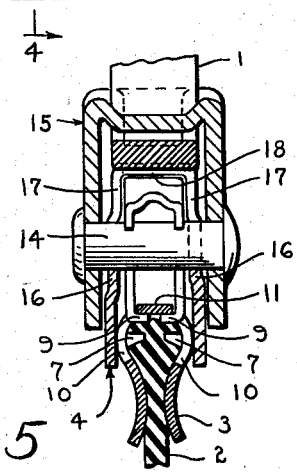
Figure 5 is a vertical section taken substantially on line 5—5 of Figure 3.

The connector fitting 4 is generally of channel shape and preferably includes a manually operable latch 8 resiliently and pivotally supported on the wiping element 2 for movement in two directions by means of integral inturned projections 9 which extend through clearance apertures 10 in the sides of the support 3. More specifically in this respect, the projections 9 are inserted for disposition between the top of the wiping element 2 and the under side of the metal bridge or base portion 11 of the support 3 separating the apertures 10. With this arrangement the fitting and latch are normally maintained in an erect position by the inherent resilience of the wiping element as exemplified in Figure 5, and since the fitting and latch are each independently mounted on or carried by the element, one serves to influence the pivotal or rocking movement of the other when the blade is driven back and forth across a surface to be cleaned.

The latch 8 is arranged substantially within the confines of the connector or fitting 4 and is provided with a holding portion 12 which normally serves as an upper closure for an opening or recess 13 provided in the fitting. This recess is adapted to receive an entering or bridge part preferably in the form of a cross pin 14 carried by an adapter 15. The recess is preferably made by providing the side walls 16 of the fitting with notches 17 and cutting out a portion of its top wall 18 so that the pin 14 may be inserted sideways into the recess and held therein by the latch. The parts are so constructed and arranged that when being connected the pin 14 will engage and move the holding portion 12 of the latch rearwardly as illustrated by the dotted lines in Figure 3, and when the pin is properly seated in the recess 13, the latch will automatically return to the full line locking position. In other words, it is not necessary to manipulate or finger the latch prior to inserting the pin into the recess.

The fitting 4 and latch 8 and manner of attaching them to the wiper blade is claimed in my copending application Serial No. 311,425, filed September 25, 1952.

This recess is also designed to receive a cross pin carried by an arm of different current manufacture, such as the arm disclosed in the John W. Anderson Patent No. 2,432,693, dated December 16, 1947. The top wall 18 of the fitting is also provided with an aperture spaced from the recess to form a bridge 19 so that another arm of current manufacture and disclosed in the aforesaid patent may be received in the hook on such arm.

The wiper arm 1 is preferably provided with an entering part in the form of a curved hook or finger 20 having an integral retaining lug or projection 21, formed adjacent the end of the hook. An actuating arm of this character cannot be connected to operate with the particular blade described without the additional connector or adapter 15 provided by the present invention.

The adapter 15 for operatively connecting the hook 20 of the actuating arm to the wiper blade fitting 4 is preferably made in the form of a channel, and among other things, includes a pair of spaced corresponding side walls 22 joined by top wall portion 23 provided with a generally square opening 24 for the reception of the finger 20. The top portion 23 is also provided with a relatively narrow transverse clearance aperture 25 and an indented inclined bridge portion 26 disposed between the opening and aperture. This bridge portion provides an abutment 27. When the adapter is assembled with a fitting, this abutment assumes a predetermined spaced position with respect to the bridge 19 on the fitting to form a passageway, the passageway being of a size that the lug 21 on hook 20 of the arm cannot pass therethrough, but may engage the abutment 27 to prevent accidental separation of the blade from the arm.

The top wall 23 of the adapter 15 is provided with an integral inturned inclined guide portion 28 and a pair of corresponding downturned portions 29 to constitute end walls of the adapter. The inturned portion 28 is located in a predetermined relation with respect to the bridge portion 26 to assist in piloting the hook portion 20 into the adapter through the opening 24 to position the lug 21 as shown in Figure 2. The portion 28 also serves to prevent entry of the end of the hook into the opening 24 of the adapter in any other connected position than that illustrated. The end walls 29 of the adapter are of a length to more or less engage the upper portions of the fitting 4 as shown in Figure 3, so as to prevent the end of the hook 20 from being inserted into either end of the adapter. More specifically the end walls 29 constitute stops or projections which are engageable with the fitting 4 so as to assist in locating the bridge 26 of the adapter 15 in a predetermined position. With this setup, the adapter can be assembled with the arm in only one position. However, as will be described subsequently, the adapter can be assembled with the fitting in either of two positions.

The adapter is preferably designed and constructed for assembly to the arm prior to connection with the fitting 4, and this is easily and quickly accomplished by simply inserting the curved finger 20 into the opening 24 as shown in Figure 2 and the cross pin 14 of the adapter is then pressed against the holding portion 12 of the latch 8 to retract the latch, as shown by the dotted lines in Figure 3, and allow the pin to enter the recess 13, after which the latch snaps back to the full line holding position shown in said figure to lock the pin in place until released by manual operation of the latch. When the cross pin 14 of the adapter is locked in the recess 13 of the fitting, the adapter will receive the fitting. More particularly in this respect, the side walls of the adapter straddle the fitting in such a manner that there is very little side play between the adapter and fitting. As pointed out above, the end walls of the adapter are of a size to prevent entry of the hook part of an arm through either end of the adapter. The end walls also serve to more or less engage the fitting in a manner whereby to prevent tilting of the adapter relative to the fitting. In other words, the adapter is held in a substantially firm position on the fitting.

When the parts are assembled as clearly illustrated in Figure 3 of the drawing, the hook will extend through the opening provided in the adapter and also through the opening or space between the cross pin 14 and bridge means 26, with the end of the hook located in the clearance aperture 25 and the lug 21 in a position relative to the abutment 27. The hook will also assume a position between the bridge means 26 on the adapter and the bridge means 19 on the fitting, and normally bear against bridge means 19. As pointed out above, the adapter can be assembled with the fitting in either of two positions. It may be assembled as shown in Figure 3 or in a reverse position. In the reverse position, the inclined guide portion 28 of the adapter will take a position opposite the bridge means 19 on the fitting and when the parts are assembled the hook 20 will bear against the top wall 18 of the fitting in lieu of bridge means 19.

Figure 4:
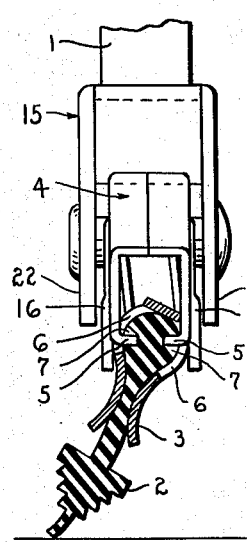
Figure 4 is a vertical section taken substantially on line 4—4 of Figure 3.

Moreover, it will be apparent that the resilient wiping element or the resilient means disposed in the support 3 serves a plurality of functions. For example, the resilient means serves to resiliently support the fitting 4 and latch means 8, and that the latch means in turn serves to detachably connect the adapter to the fitting and the hook connected to the adapter. Attention is directed to the fact that the resilient wiper element 2 comprises a portion having wiping edges for engaging the surface to be cleaned and an attaching portion, constituting resilient means, seated in the channel support 3. The wiping portion and attaching portion are in effect operable independently of one another because the side walls of the support comprise an intermediate portion of the element as clearly shown in Figures 4 and 5.

Having thus described my invention, it is obvious that various modifications may be made in the same without departing from the spirit of the invention; and, therefore, I do not wish to be understood as limiting myself to the exact form, construction, arrangement and combination of parts herein shown and described and defined in the claims.

I claim:

1. An article of manufacture for connecting a bent end of a windshield wiper arm to a connector on a wiper blade, said article being formed to provide a top wall and a pair of spaced substantially parallel side walls, said top wall having an opening for receiving the bent end of an arm, a cross-member carried by and extending between the side walls and spaced from the top wall for engaging a connector, and said article having means at its ends for engaging a connector.

2. An article of manufacture for connecting a bent end of a windshield wiper arm to a connector on a wiper blade, said article being formed to provide a top wall and a pair of spaced substantially parallel side walls, said top wall having an inset bridge portion and also having an opening for receiving and housing the bent end of the arm having a lug thereon, and a cross-member carried by and extending between the side walls and spaced from the top wall for engaging a connector, the arrangement being such that when the bent end of the arm is extended into the opening and between the cross-member and bridge portion to receive the bridge portion the lug may be caused to engage the bridge portion to prevent accidental release of the article from the said bent end.

3. An article of manufacture for connecting a bent end of a windshield wiper arm to a connector on a wiper blade, said article having a top wall and a pair of spaced substantially parallel side walls, said top wall having an inset bridge portion and also having an opening for receiving the bent end of an arm having a lug thereon, a cross-member carried by the side walls, projections on the article for maintaining the top wall spaced from a connector, the arrangement being such that when the bent end is located in the opening and receives the bridge portion the lug may engage the bridge portion to prevent accidental release of the article from the bent end, and said top wall being provided with an inturned inclined portion to assist in directing the bent end into the opening.

4. A windshield wiper blade, a connector carried by the blade, said connector comprising a latch and a housing provided with a recess, a channel having substantially parallel side walls straddling the connector and also having a top wall provided with a bridge portion, an opening and an inturned inclined portion, means carried by and extending between the side walls of the channel and spaced from the top wall, said means being seated in the recess with the latch detachably holding the means therein, said channel also having stops engaging the connector to space said top wall from the connector, a wiper arm part arranged in the opening and between the side walls in the space between the top wall and connector, said arm part also being arranged between the bridge portion and inclined portion and bearing against the connector, and a lug on the arm part which may engage the bridge portion to prevent release of the channel from the arm part when the channel is secured to a connector.

5. A windshield wiper blade, a connector carried by the blade, said connector comprising a latch and a housing provided with a recess, a one-piece housing having substantially parallel side walls straddling the connector and also having a top wall provided with a bridge portion and an opening, a cross-member carried by and extending between the side walls of the housing seated in the recess with the latch detachably holding the means therein, a bent wiper arm part arranged in the opening and receiving the bridge portion of the housing, and a lug on the arm, the structural relationship between the bridge portion of the housing and connector being such that the lug is held in relation to the bridge portion so that the housing cannot be removed from the arm part.

FRED A. KROHM.

REFERENCES CITED

The following references are of record in the file of this patent:

UNITED STATES PATENTS

| Number | Name | Date |
| --- | --- | --- |
| 1,872,095 | Romano et al. | Aug. 16, 1932 |
| 2,156,506 | Marcolivio | May 2, 1939 |
| 2,234,791 | Zaiger | Mar. 11, 1941 |
| 2,274,277 | Rousseau et al. | Feb. 24, 1942 |
| 2,284,823 | Horton | June 2, 1942 |
| 2,295,011 | Rodrick | Sept. 8, 1942 |
| 2,432,693 | Anderson | Dec. 16, 1947 |